(No Model.)
J. L. COLLYER.
Packing for Pistons.
No. 236,987. Patented Jan. 25, 1881.
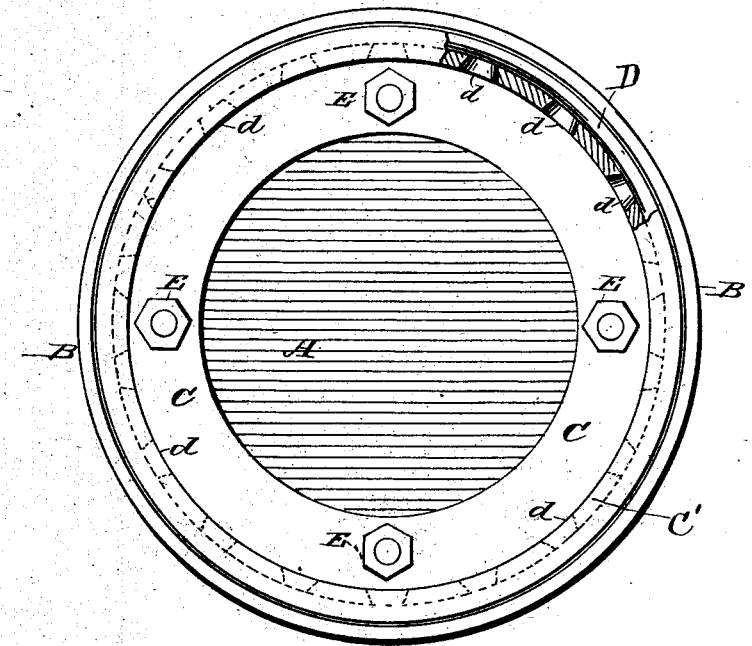
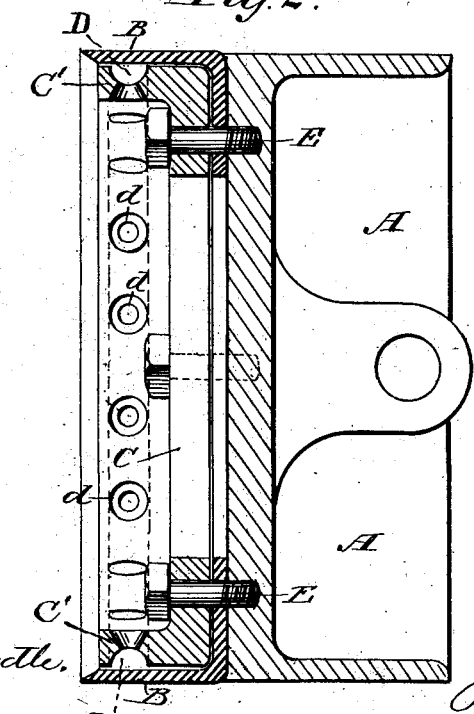
WITNESSES:
Francis McArdle
J. E. Brundage
INVENTOR:
John L. Collyer,
BY E. R. Brown,
ATTORNEY.

UNITED STATES PATENT OFFICE.

JOHN L. COLLYER, OF BROOKLYN, NEW YORK.

PACKING FOR PISTONS.

SPECIFICATION forming part of Letters Patent No. 236,987, dated January 25, 1881.

Application filed November 12, 1880. (No model.)

*To all whom it may concern:*

Be it known that I, JOHN L. COLLYER, of Brooklyn, in the county of Kings and State of New York, have invented an Improvement in Packing for Pistons of Printing-Presses; and I do hereby declare that the following is a full, clear, and exact description thereof.

My invention relates to that class of printing-presses in which a horizontal bed (which carries the type) reciprocates under a cylinder, (which carries the paper to be printed.) The under side of the bed in the class of presses referred to carries two hollow cylinders, and at the ends of the frame of the machine are two stationary pistons or plungers. At each stroke of the reciprocating bed the open end of one of the cylinders engages with one of the pistons, and thus an air-cushion is formed which lessens the jar and concussion. The pistons are packed with leather or other flexible material, and when the packings become loose from wear they are tightened in various ways. One mode of tightening the packing consists in winding a strip of paper between the packing and the periphery of the piston. Another mode consists in the employment of a spring, the expansion of which keeps the packing tight; but in both of these modes the tight fitting of the piston in the cylinder is constant, and the friction is the same in both the forward and the backward stroke of the bed.

The object of this invention is to tighten the packing on the forward stroke of the bed, and to loosen or allow it to contract on the backward stroke of said bed, and thereby reduce the friction and wear of the packing.

To this end the invention consists in a follower of novel construction, and the combination thereof with the packing and the piston or plunger, whereby provision is made for expanding the packing by the force of the air in the cylinder on the forward stroke of the bed, and allowing the packing to contract on the backward stroke of the bed.

In the accompanying drawings, Figure 1 is a front view illustrating my invention. Fig. 2 is a central or diametrical sectional view of the same.

A represents the piston or plunger, which may be of the usual or any suitable description.

B represents the leather packing, which is shaped like a ring with a rim, or, in other words, like a round box with a hole in the center.

C represents the follower, which is also in the form of a ring, provided with a rim, C'; but the rim of the follower is narrower than the rim of the packing. The follower C fits in the packing B, and both are fastened to the piston by screws or bolts E. In the periphery or rim of the follower C are holes $d$, which terminate in a peripherical groove, D, which extends entirely around the rim C' of the ring C.

On the forward stroke of the bed of the press, the air rushes through the holes $d$ and the groove D and expands the packing B, so as to tighten it as the piston or plunger enters the mouth of the cylinder. On the back-stroke of the bed, the pressure of air from the cylinder having ceased, the packing is allowed to contract, and the friction and resistance are lessened.

It is obvious that this invention is applicable to presses where the cylinders are stationary and the pistons are carried by the reciprocating bed, as well as to presses where the pistons are stationary and the cylinders carried by the bed.

I am aware of Patent No. 153,678; but such patent does not show the ring having a laterally-projecting rim formed with a peripherical groove into which open the holes in said rim. Such is the essential feature of my invention.

What I claim as new, and desire to secure by Letters Patent, is—

In a piston for printing-presses, the combination, with the plunger A and cup-shaped packing B, of the ring C, having a laterally-projecting rim, C', formed with a peripherical groove, D, entirely around it, and with holes $d$, opening into said groove, the whole being constructed and arranged as and for the purposes described.

JOHN L. COLLYER.

Witnesses:
E. R. BROWN,
J. E. BRUNDAGE.